(No Model.)
4 Sheets—Sheet 1.
J. H. SUYDAM, Sr.
LATH CARRYING DEVICE FOR WALL PAPER OR OTHER MACHINES.
No. 602,375. Patented Apr. 12, 1898.
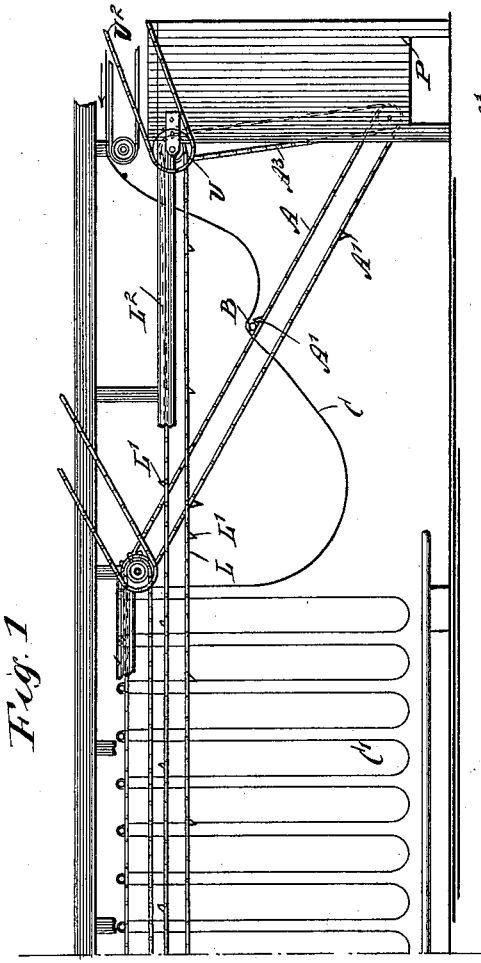
Fig. 1
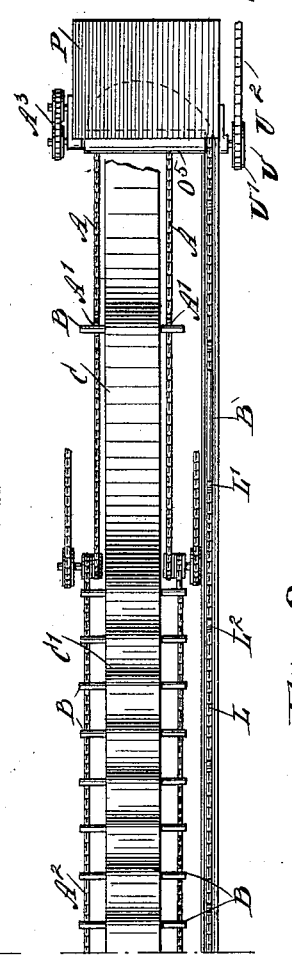
Fig. 2
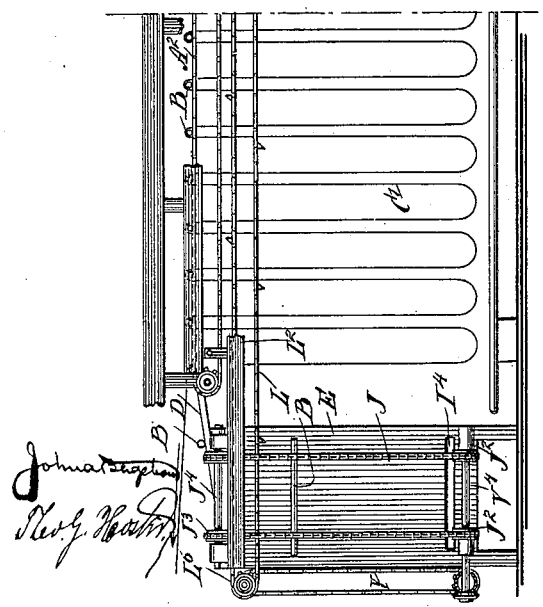
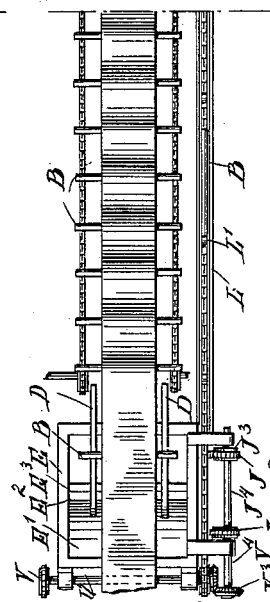
INVENTOR
J. H. Suydam Sr.
ATTORNEYS.

(No Model.) 4 Sheets—Sheet 2.

J. H. SUYDAM, Sr.
LATH CARRYING DEVICE FOR WALL PAPER OR OTHER MACHINES.

No. 602,375. Patented Apr. 12, 1898.

WITNESSES
INVENTOR
J. H. Suydam, Sr.
BY
ATTORNEYS.

(No Model.) 4 Sheets—Sheet 3.
J. H. SUYDAM, Sr.
LATH CARRYING DEVICE FOR WALL PAPER OR OTHER MACHINES.
No. 602,375. Patented Apr. 12, 1898.
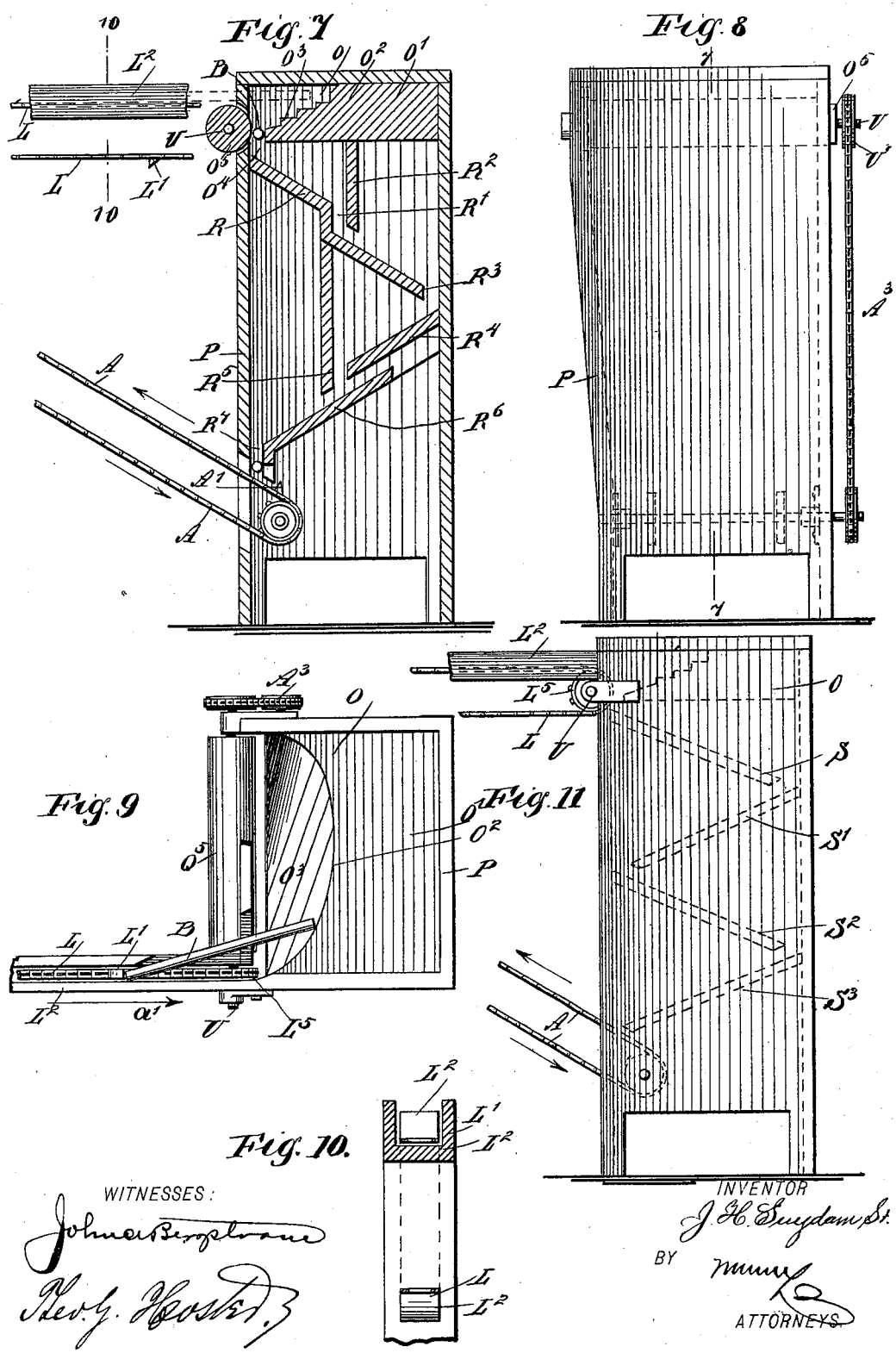

(No Model.) 4 Sheets—Sheet 4.
J. H. SUYDAM, Sr.
LATH CARRYING DEVICE FOR WALL PAPER OR OTHER MACHINES.
No. 602,375. Patented Apr. 12, 1898.
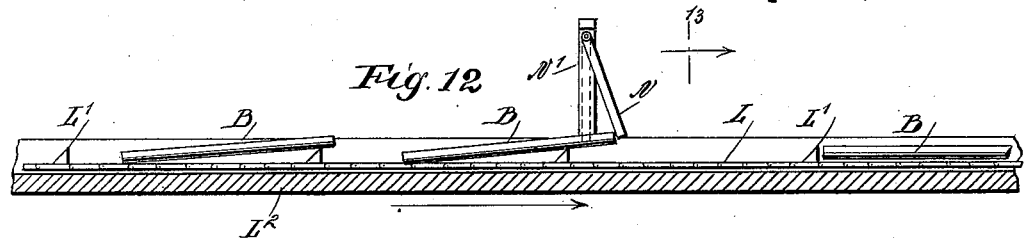
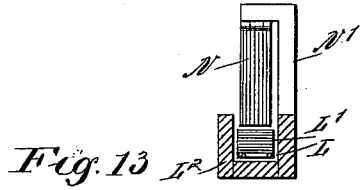
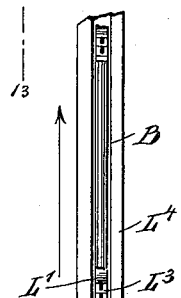
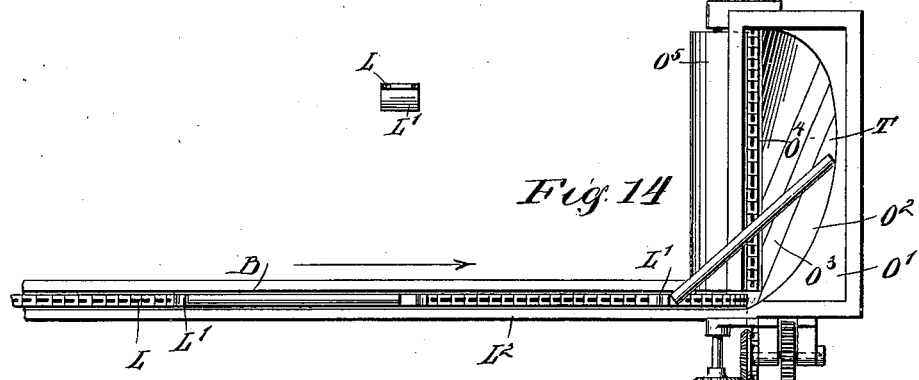
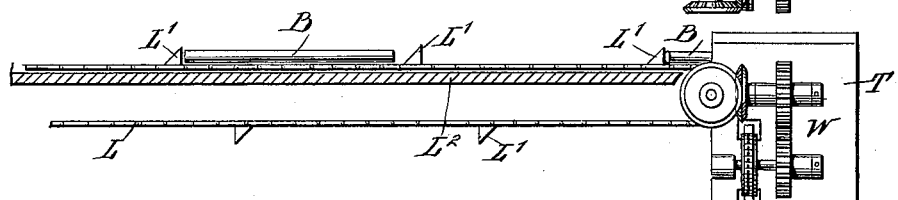
WITNESSES:
INVENTOR
J. H. Suydam, Sr.
BY
ATTORNEYS.

UNITED STATES PATENT OFFICE.

JOHN H. SUYDAM, SR., OF NEW BRUNSWICK, NEW JERSEY, ASSIGNOR OF ONE-HALF TO IRVING E. BROWN, OF SAME PLACE.

LATH-CARRYING DEVICE FOR WALL-PAPER OR OTHER MACHINES.

SPECIFICATION forming part of Letters Patent No. 602,375, dated April 12, 1898.

Application filed June 15, 1897. Serial No. 640,834. (No model.)

*To all whom it may concern:*

Be it known that I, JOHN H. SUYDAM, Sr., of New Brunswick, in the county of Middlesex and State of New Jersey, have invented a new and Improved Lath-Carrying Device for Wall-Paper or other Machines, of which the following is a full, clear, and exact description.

The invention relates to sticking-machines used for hanging wall-paper and the like in festoons to dry; and its object is to provide a new and improved lath-carrying device arranged in such a manner that laths after leaving the sticking-machine are automatically returned and fed again to the sticking-machine to take up new folds of paper.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figures 3, 4:
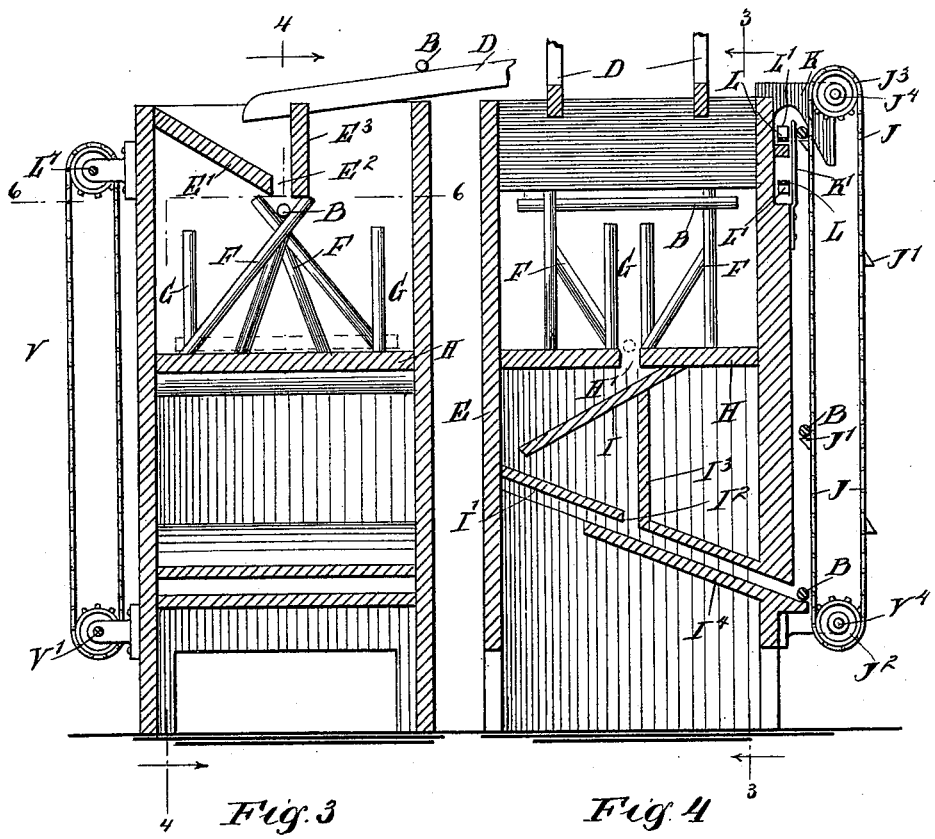
Figures 5, 6:
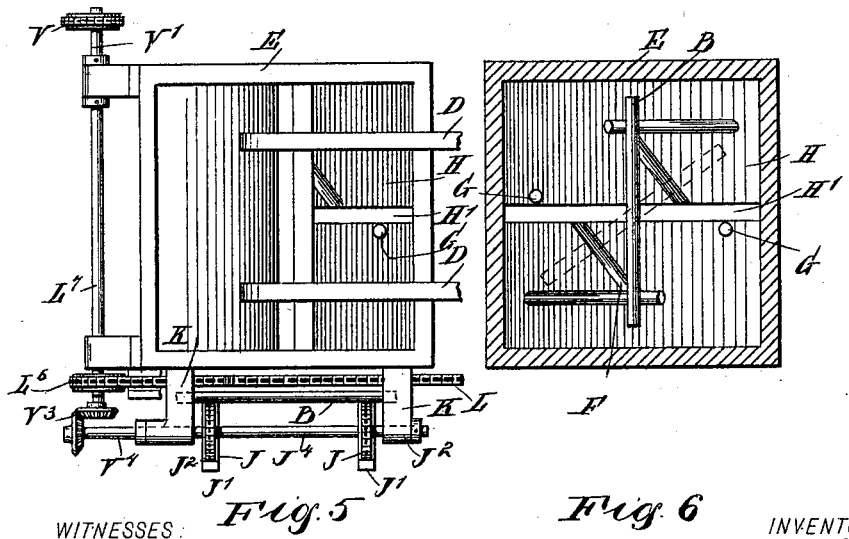

Figure 1 is a side elevation of the improvement arranged in conjunction with a sticking-machine. Fig. 2 is a plan view of the same. Fig. 3 is an enlarged sectional side elevation of the lath-receiver at the end of the sticking-machine, the section being taken on the line 3 3 of Fig. 4. Fig. 4 is a transverse section of the same on the line 4 4 of Fig. 3. Fig. 5 is a plan view of the same. Fig. 6 is a sectional plan view of the same on the line 6 6 of Fig. 3. Fig. 7 is an enlarged sectional side elevation of the lath-delivery hopper for a sticking-machine, the section being taken on the line 7 7 of Fig. 8. Fig. 8 is an end elevation of the same. Fig. 9 is a plan view of the same with the cover removed. Fig. 10 is an enlarged transverse section of the lath-return carrier-chain, the section being taken on the line 10 10 of Fig. 7. Fig. 11 is a side elevation of a modified form of the delivery-hopper. Fig. 12 is an enlarged sectional side elevation of the return lath-carrier with the lath-adjusting device. Fig. 13 is a transverse section of the same on the line 13 13 of Fig. 12. Fig. 14 is a plan view of the arrangement for turning the lath around a corner, and Fig. 15 is a sectional side elevation of the same.

The sticking-machine on which the improvement is applied is provided with the usual carrier-chains A, having projections A' for engaging and supporting laths or sticks B, preferably made circular in cross-section, as plainly indicated in the drawings. The paper C or other material to be hung in festoons C' is fed upon a lath B, while the latter travels up the carrier-chains A, as indicated in Fig. 1, the said lath being finally delivered to a second carrier-chain $A^2$, which carries the lath along together with the festoons C', as is well known.

At the end of the sticking-machine the laths roll from under the paper down an incline D into a lath-receiver E, located at the end of the sticking-machine, as is plainly shown in the drawings, special reference being had to Figs. 3, 4, 5, and 6.

The lath-receiver E is provided in its upper end with an incline E', upon which pass the laths from the incline D and down which incline the laths roll to finally drop through an opening $E^2$ upon sets of inclined sticks F, of which the upper end of one stick abuts against the under side of a transverse partition $E^3$, forming the outer wall of the opening $E^2$, so that the stick is guided upon the sets of inclined sticks F to slide down the same and make a quarter-turn to finally land against stops G, placed on opposite sides and ends of a longitudinal slot H', formed in a bottom H and arranged horizontally in the lath-receiver E. The stick B, after dropping through the opening H', lands on an incline I, down which the said stick rolls upon a second incline I', at the lower end of which the stick drops through a slot $I^2$, the outer wall of the said slot being formed by a vertical partition $I^3$.

When the stick B drops through the slot $I^2$, it passes into an inclined channel $I^4$, down which it rolls to be taken up at the lower end thereof by lugs J' of carrier-chains J, mounted to travel on the outside of the lath-receiver E, as is plainly indicated in the drawings. The carrier-chains J lift the sticks B successively upward as the sticks are discharged from the sticking-machine and passed through the lath-receiver E, as above described, the sticks being finally delivered by the said carrier-chains J under an incline K and over a longitudinally-extending guide-board K', so that the sticks drop upon a carrier-chain L, provided with lugs L' for engaging the rear end of the stick to carry the same longitudinally on one side of the sticking-machine, as plainly indicated in Fig. 2, toward the beginning or feed end of the said machine.

Some of the sticks dropped upon the upper run of the carrier-chain L may fall upon one of the lugs L', and in order to move such sticks down upon the chain against a succeeding lug L', I provide the device shown in Fig. 12, which device consists of an arm N, fulcrumed at its upper end on a bracket N', secured to one side of a trough $L^2$, in which travels the upper run of the chain L and which trough extends from the lath-receiver E to a lath-turning device O, arranged in a feed-hopper P at the beginning or front end of the sticking-machine. The lower end of the arm N extends down into the trough $L^2$, so that a stick B, resting on one of the lugs L', as shown in Fig. 12, strikes with its forward end against the said arm, and is consequently pushed by the latter off the lug as the chain travels forward, until the forward end of the said stick drops off the advancing lug and now lies horizontally on the upper run of the chain L. The returning sticks B finally pass off the chain L into a turning device O, previously mentioned, and provided with a block O', (see Figs. 7, 8, and 9,) having a curved edge $O^2$, against which abuts the forward end of a stick B as the latter is pushed forward by the end of the chain L, so that the stick makes a quarter-turn and drops down steps $O^3$, arranged diagonally, as is plainly indicated in Figs. 7 and 9, so that the stick finally passes into a transverse slot $O^4$, the outer wall of which is formed by a roller $O^5$, rotated, as hereinafter more fully described, so as to assist in placing the stick in a transverse position and to cause the stick to drop through the slot $O^4$ upon an incline R, arranged in the hopper P. The incline R delivers the stick to a slot R', formed by the incline R and a partition $R^2$, so that the stick drops upon a second incline $R^3$ and rolls down the same to finally drop upon another incline $R^4$, extending in an opposite direction to the inclines R $R^3$, said stick finally dropping off the end of the incline $R^4$ down along a vertical partition $R^5$ upon an incline $R^6$, from which the stick passes into a slot $R^7$, disposed vertically and opening upon the carrier-chains A previously mentioned, so that the lugs A' of the said chain engage the sticks and carry them upward for receiving the paper C, as previously explained. The partitions $R^2$ and $R^5$ retard the rolling-down motion of the sticks, so that they are not liable to assume other than a transverse position to properly pass upon the carrier-chains A.

Now it will be seen that by the arrangement described the laths after leaving the sticking-machine are automatically returned to the carrier-chains A of the sticking-machine, so as to again take up and hang the paper in festoons for the purpose of drying. Thus the device described forms a feed for the sticking-machine, and no manual labor whatever is required for returning the laths from the end of the sticking-machine to the beginning thereof, as is the case with machines now in use.

The inclines in the feed-hopper P may be arranged as shown in Fig. 11, in which the vertical partitions are dispensed with and a series of inclines S, S', $S^2$, and $S^3$ are alternately arranged in opposite directions, the lowermost incline finally discharging upon the carrier-chain A, as above described.

In case the sticking-machine is formed with a bend by extending from one building to another at right angles I provide an additional chain $L^3$, similar to the chain L and connected with the same by a turning device T, similar in construction to the turning device O. (See Figs. 14 and 15.) Thus a lath or stick B, hung on the chain L, is given a quarter-turn by the device T and delivered upon the chain $L^3$, which extends with its upper run into a trough $L^4$.

In order to impart the necessary motion to the sticking-machine and the various parts of the improvement, I provide a shaft U, carrying a sprocket-wheel U', connected by a sprocket-chain $U^2$ with other machinery for rotating the said shaft in the direction of the arrow $a'$. (See Figs. 7, 8, and 9.)

The shaft U is connected by sprocket-wheels and sprocket-chains $A^3$ with the shaft for the lower wheels for the carrier-chain A, so that the latter is actuated in the usual manner, and on said shaft U is also secured a roller $O^5$ for the turning device T, as previously explained. On the shaft U is also fastened a sprocket-wheel $L^5$ for the carrier-chain L, having its outer end passing over a sprocket-wheel $L^6$, secured on a shaft $L^7$, connected by sprocket wheels and chain V with a shaft V', journaled on the lath-receiver E, as indicated in Figs. 3, 4, and 5. This shaft V is connected by beveled gear-wheels $V^3$ with a shaft $V^4$, carrying the lower sprocket-wheel J' for the elevating carrier-chains J, passing at their upper ends over sprocket-wheels $J^3$, secured on a shaft $J^4$, journaled in suitable bearings $J^2$, attached to the incline K, previously mentioned.

By the arrangement described the several devices move in unison, so that the sticks or laths are automatically returned from the discharge end of the sticking-machine to the feed end thereof to take up new folds of paper and hang the same in festoons.

Having thus fully described my invention, I claim as new and desire to secure by Letters Patent—

1. A lath-carrying device provided with a return lath-carrier, and a turning device arranged to give the sticks a quarter-turn, the said turning device receiving the sticks from the carrier and delivering them to the feed of the sticking-machine, substantially as shown and described.

2. A lath-carrying device provided with a return lath-carrier leading from the discharge end of a sticking-machine to the feed end, and a turning device receiving the sticks from the carrier and delivering them to the feed of the sticking-machine, the said turning device having a curved surface adapted to engage the end of a lath, substantially as shown and described.

3. A lath-carrying device, comprising a lath-receiver at the end of a sticking-machine, for receiving the sticks from the latter, a turning device within the said lath-receiver, for giving a quarter-turn to the sticks, an elevator receiving the turned sticks from the said receiver, a return carrier-chain receiving the sticks from the said elevator, a turning device receiving the sticks from the said carrier, and a feed-hopper receiving the sticks from the said turning device and delivering them to the carrier-chain of the sticking-machine, substantially as shown and described.

4. A lath-carrying device, provided with a lath-receiver at the end of a sticking-machine, the said lath-receiver being provided with a turning device for giving the stick a quarter-turn, substantially as shown and described.

5. A lath-carrying device, provided with a lath-receiver having an incline, and sets of inclined sticks at the lower end of said incline, for giving a lath a quarter-turn, the said sticks discharging the laths upon a delivery device forming part of the said receiver, substantially as shown and described.

6. A lath-carrying device, comprising a lath-receiver having a turning device, an elevator receiving the laths from the said receiver, and a return carrier-chain having lugs, and receiving said laths from the said elevator, substantially as shown and described.

7. A lath-carrying device, comprising a lath-receiver having a turning device, an elevator receiving the laths from the said receiver, a return carrier-chain having lugs, and receiving said laths from the said elevator, and a transferring device intermediate of the said chain and elevator, and comprising inclines and guide-rails, substantially as shown and described.

8. A lath-carrying device, provided with a turning device comprising sets of inclined sticks, and stop-pins at the lower ends of the said sticks, substantially as shown and described.

9. A lath-carrying device, provided with a lath-turning device, comprising a carrier-chain having lugs, and a block having a curved edge adapted to engage the outer end of a lath, the other end being pressed on by a lug on the said chain, substantially as shown and described.

10. A lath-carrying device, provided with a lath-turning device, comprising a carrier-chain having lugs, and a block having a curved edge adapted to engage the outer end of a lath, the other end being pressed on by a lug on the said chain, the said block having a step-bottom, with the steps running diagonally, substantially as shown and described.

11. A lath-carrying device, provided with a lath-turning device, comprising a carrier-chain having lugs, a block having a curved edge adapted to engage the outer end of a lath, the other end being pressed on by a lug on the said chain, the said block having a step-bottom, with the steps running diagonally, and a roller mounted to revolve opposite the lowermost step, and forming a slot between the two for the lath to pass downward, substantially as shown and described.

12. A lath-carrying device, provided with two return lath-carrying chains traveling in unison, and a turning device at the adjacent ends of the said chains, for turning a lath delivered by one chain and placing the turned lath on the other chain, substantially as shown and described.

13. A lath-carrying device, provided with a lath-carrying chain having lugs, a trough in which travels the upper run of the said chain, and an adjusting device for the lath, and provided with an arm mounted to swing and extending into the said trough above the upper ends of the lugs, substantially as shown and described.

14. A lath-carrying device provided with a lath-receiver at the discharge end of a sticking-machine, the said lath-receiver being provided with a turning device for the sticks, a return lath-carrier, and a turning device, receiving the sticks from the return-carrier, substantially as shown and described.

JOHN H. SUYDAM, Sr.

Witnesses:
W. E. SPERLING,
GEORGE BERDINE.